United States Patent
Liu et al.

(10) Patent No.: US 10,404,430 B2
(45) Date of Patent: Sep. 3, 2019

(54) METHOD FOR TRANSMITTING PILOT SIGNAL, BASE STATION, AND USER EQUIPMENT

(71) Applicant: Huawei Technologies Co., Ltd., Shenzhen (CN)

(72) Inventors: Jianqin Liu, Beijing (CN); Jianghua Liu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 223 days.

(21) Appl. No.: 15/184,546

(22) Filed: Jun. 16, 2016

(65) Prior Publication Data

US 2016/0315746 A1    Oct. 27, 2016

Related U.S. Application Data

(63) Continuation of application No. PCT/CN2013/089579, filed on Dec. 16, 2013.

(51) Int. Cl.
*H04W 24/10* (2009.01)
*H04L 5/00* (2006.01)
(Continued)

(52) U.S. Cl.
CPC ......... *H04L 5/0048* (2013.01); *H04B 7/0413* (2013.01); *H04L 5/0023* (2013.01);
(Continued)

(58) Field of Classification Search
CPC ...... H04L 5/0048; H04L 5/005; H04L 5/0051
See application file for complete search history.

(56) References Cited

U.S. PATENT DOCUMENTS

2007/0036066 A1*  2/2007  Thomas ............... H04B 7/0678
                                                    370/208
2008/0075181 A1*  3/2008  Xia ....................... H04L 5/0048
                                                    375/260
(Continued)

FOREIGN PATENT DOCUMENTS

CN        101174866 A     5/2008
CN        101867948 A     10/2010
(Continued)

OTHER PUBLICATIONS

"Consideration on CSI-RS design for CoMP and text proposal to 36.814," 3GPP TSG RAN WG1 #57bis, Los Angeles, USA, R1-092364, 3rd Generation Partnership Project, Valbonne, France (Jun. 29-Jul. 3, 2009).

(Continued)

*Primary Examiner* — Jason E Mattis
*Assistant Examiner* — Hong Shao
(74) *Attorney, Agent, or Firm* — Leydig, Voit & Mayer, Ltd.

(57) ABSTRACT

The present invention provides a method for transmitting a pilot signal, a base station, and user equipment The method including: determining, by a base station, a transmission period of a pilot antenna port group; and sending, by the base station, in a transmission period corresponding to each pilot antenna port group, a pilot signal to user equipment by using a resource corresponding to the pilot antenna port group, so that the user equipment measures channel quality according to the pilot signal. By means of the technical solutions provided in the embodiments of the present invention, pilot signal overheads can be reduced.

11 Claims, 7 Drawing Sheets

---

A base station determines a transmission period of a pilot antenna port group — S100

The base station sends, in a transmission period corresponding to each pilot antenna port group, a pilot signal to user equipment by using a resource corresponding to the pilot antenna port group — S101

(51) Int. Cl.
*H04W 72/04* (2009.01)
*H04B 7/0413* (2017.01)
*H04W 88/02* (2009.01)
*H04W 88/08* (2009.01)

(52) U.S. Cl.
CPC ........... *H04L 5/0057* (2013.01); *H04W 24/10* (2013.01); *H04W 72/042* (2013.01); *H04W 88/02* (2013.01); *H04W 88/08* (2013.01)

(56) References Cited

U.S. PATENT DOCUMENTS

| | | | |
|---|---|---|---|
| 2011/0249767 A1* | 10/2011 | Chen ................ | H04L 5/0023 375/295 |
| 2012/0113852 A1 | 5/2012 | Ku et al. | |
| 2013/0258964 A1 | 10/2013 | Nam et al. | |
| 2013/0286964 A1* | 10/2013 | Chu ................. | H04L 27/261 370/329 |
| 2013/0329664 A1 | 12/2013 | Kim et al. | |
| 2014/0036800 A1* | 2/2014 | Frenne .............. | H04L 5/0035 370/329 |
| 2014/0301238 A1 | 10/2014 | Chun et al. | |
| 2014/0314041 A1* | 10/2014 | Kim ................. | H04L 5/0048 370/329 |
| 2015/0085785 A1* | 3/2015 | Kim ................. | H04L 5/0092 370/329 |
| 2015/0105025 A1* | 4/2015 | Zhang .............. | H01Q 3/26 455/63.4 |
| 2015/0131604 A1* | 5/2015 | Hammarwall ...... | H04L 1/0026 370/330 |
| 2015/0180628 A1 | 6/2015 | Kim et al. | |
| 2015/0236801 A1* | 8/2015 | Sun ................. | H04B 17/27 370/328 |
| 2015/0289155 A1* | 10/2015 | Gao ................. | H04L 5/0057 370/252 |
| 2015/0312927 A1* | 10/2015 | Ko .................. | H04B 7/024 370/336 |
| 2016/0006547 A1* | 1/2016 | Kang ................ | H04L 5/0048 370/329 |
| 2016/0050153 A1* | 2/2016 | Xu .................. | H04L 5/0023 370/230 |

FOREIGN PATENT DOCUMENTS

| | | |
|---|---|---|
| CN | 101366200 B | 7/2012 |
| JP | 2012527136 A | 11/2012 |
| JP | 2015523814 A | 8/2015 |
| WO | 2007021384 A2 | 2/2007 |
| WO | WO 2011047351 A2 | 4/2011 |
| WO | 2013077661 A1 | 5/2013 |
| WO | WO 2013110219 A1 | 8/2013 |
| WO | 2013144365 A1 | 10/2013 |
| WO | 2013147565 A2 | 10/2013 |
| WO | 2013181850 A1 | 12/2013 |
| WO | 2014010994 A1 | 1/2014 |

OTHER PUBLICATIONS

"3rd Generation Partnership Project; Technical Specification Group Radio Access Network; Evolved Universal Terrestrial Radio Access (E-UTRA); Physical layer procedures (Release 10)," 3GPP TS 36.213, V10.3.0, pp. 1-122, 3$^{rd}$ Generation Partnership Project, Valbonne, France (Sep. 2011).

"3rd Generation Partnership Project; Technical Specification Group Radio Access Network; Evolved Universal Terrestrial Radio Access (E-UTRA); Physical Channels and Modulation (Release 10)," 3GPP TS 36.211, V10.3.0, pp. 1-103, 3$^{rd}$ Generation Partnership Project, Valbonne, France (Sep. 2011).

"Considerations on CSI feedback enhancements for high-priority antenna configurations," 3GPP TSG-RAN WG1 #66 Athens, Greece, R1-112420, pp. 1-7, 3rd Generation Partnership Project, Valbonne, France (Aug. 22-26, 2011).

* cited by examiner

METHOD FOR TRANSMITTING PILOT SIGNAL, BASE STATION, AND USER EQUIPMENT

CROSS-REFERENCE TO RELATED APPLICATIONS

This application is a continuation of International Application No. PCT/CN2013/089579, filed on Dec. 16, 2013, which is hereby incorporated by reference in its entirety.

TECHNICAL FIELD

The present invention relates to communications technologies, and in particular, to a method for transmitting a pilot signal, a base station, and user equipment.

BACKGROUND

In a wireless communications system, a transmit end and a receive end use multiple antennas in a spatial multiplexing manner to acquire a higher rate. Compared with a general spatial multiplexing method, an enhanced technology is that a receive end feeds back channel information to a transmit end, and the transmit end uses some transmission precoding technologies according to the obtained channel information, which greatly improves transmission performance.

To obtain higher cell average spectral efficiency and improve cell-edge coverage and throughput, based on an existing Long Term Evolution (LTE for short) system, Long Term Evolution-Advanced (LTE-A for short) supports a maximum of eight antennas in the downlink, and some feedback enhancement technologies are put forward in terms of codebook feedback, which are mainly to enhance codebook feedback precision, and reduce overheads by using a time correlation and/or a frequency-domain correlation of channel information. For one sub-band or multiple joint sub-bands that need to feed back channel information, user equipment measures channel state information (CSI for short) according to a channel state information-reference signal (CSI-RS for short), and feeds back, to a base station, information about two precoding matrix indicators (PMI for short): a PMI1 and a PMI2, where the PMI1 is corresponding to a codeword W1 in a codebook C1, and the PMI2 is corresponding to a codeword W2 in another codebook C2. The base station end has information about the same C1 and C2, and finds the corresponding codewords W1 and W2 from the corresponding codebooks C1 and C2 after receiving the PMI1 and the PMI2, to obtain a codebook corresponding to a virtual W.

However, as an antenna scale increases, pilot overheads used to measure a precoding matrix, that is, overheads of the foregoing CSI-RS, also increase in the prior art.

SUMMARY

The present invention provides a method for transmitting a pilot signal, a base station, and user equipment, so as to resolve a problem in the prior art that pilot overheads increase as an antenna scale increases.

According to a first aspect of the present invention, a method for transmitting a pilot signal is provided, including:
 determining, by a base station, a transmission period of a pilot antenna port group; and
 sending, by the base station, in a transmission period corresponding to each pilot antenna port group, a pilot signal to user equipment by using a resource corresponding to the pilot antenna port group, so that the user equipment measures channel quality according to the pilot signal.

According to the first aspect, in a first possible implementation manner, different pilot antenna port groups are corresponding to different transmission periods.

With reference to the first aspect and the first possible implementation manner, in a second possible implementation manner, before the sending, by the base station, in a transmission period corresponding to each pilot antenna port group, a pilot signal by using the pilot antenna port group, the method further includes:
 sending, by the base station, first configuration information to the user equipment, where the first configuration information is used to indicate whether the pilot signal is to be sent on a dedicated bandwidth of the user equipment or to be sent on a full bandwidth corresponding to the base station.

According to the second possible implementation manner, in a third possible implementation manner, the first configuration information is downlink control information DCI, the DCI carries a first flag bit, and the first flag bit is used to indicate whether the pilot signal is to be sent on the dedicated bandwidth or to be sent on the full bandwidth.

According to the third possible implementation manner, in a fourth possible implementation manner, the pilot signal is a channel state information-reference signal CSI-RS, or a downlink demodulation reference signal DM-RS using an identity matrix as a demodulation precoding matrix.

According to a second aspect of the present invention, a method for transmitting a pilot signal is provided, including:
 determining at least two second pilot antenna ports as one first pilot antenna port; and
 sending, by a base station, a first pilot signal to user equipment by using a resource corresponding to the first pilot antenna port, where the first pilot signal is used for channel quality measurement.

According to the second aspect, in a first possible implementation manner, the determining at least two second pilot antenna ports as one first pilot antenna port specifically includes:
 performing, by the base station, weighting on each of the second pilot antenna ports by using a weighting coefficient, to obtain the first pilot antenna port, where the weighting coefficient is predefined by the base station or fed back by the user equipment.

With reference to the second aspect and the first possible implementation manner, in a second possible implementation manner, the sending, by a base station, a first pilot signal to user equipment by using a resource corresponding to the first pilot antenna port includes:
 periodically sending, by the base station, the first pilot signal to the user equipment by using the resource corresponding to the first pilot antenna port.

With reference to the second aspect, the first possible implementation manner, and the second possible implementation manner, in a third possible implementation manner, before the sending, by a base station, a first pilot signal to user equipment by using a resource corresponding to the first pilot antenna port, the method further includes:
 sending, by the base station, second configuration information to the user equipment, where the second configuration information is used to indicate a configuration parameter of the first pilot signal.

With reference to the second aspect, the first possible implementation manner, the second possible implementation manner, and the third possible implementation manner, in a fourth possible implementation manner, before the sending, by a base station, a first pilot signal to user equipment by using a resource corresponding to the first pilot antenna port, the method further includes:

sending, by the base station, third configuration information to the user equipment, where the third configuration information is used to indicate whether the base station is to send a second pilot signal to the user equipment.

With reference to the fourth possible implementation manner, in a fifth possible implementation manner, if the third configuration information indicates that the base station is to send the second pilot signal to the user equipment, after the sending, by the base station, third configuration information to the user equipment, the method further includes:

aperiodically sending, by the base station, a second pilot signal to the user equipment by using a resource corresponding to the second pilot antenna port.

According to a third aspect of the present invention, a method for transmitting a pilot signal is provided, including:

receiving, by user equipment, in a transmission period corresponding to each pilot antenna port group of a base station, a pilot signal by using a resource corresponding to the pilot antenna port group; and performing, by the user equipment, channel quality measurement according to the pilot signal, where the transmission period of the pilot antenna port group of the base station is determined by the base station.

According to the third aspect, in a first possible implementation manner, before the receiving, by user equipment, in a transmission period corresponding to each pilot antenna port group of a base station, a pilot signal by using a resource corresponding to the pilot antenna port group, the method further includes:

receiving, by the user equipment, first configuration information; and determining, by the user equipment, according to the first configuration information, whether to receive the pilot signal on a dedicated bandwidth of the user equipment or to receive the pilot signal on a full bandwidth corresponding to the base station.

According to a fourth aspect of the present invention, a method for transmitting a pilot signal is provided, including:

receiving, by user equipment, by using a resource corresponding to a first pilot antenna port, a first pilot signal sent by a base station, where the first pilot antenna port is determined by the base station according to at least two second pilot antenna ports, and the first pilot signal is used for channel quality measurement.

According to the fourth aspect, in a first possible implementation manner, before the receiving, by user equipment, by using a resource corresponding to a first pilot antenna port, a first pilot signal sent by a base station, the method further includes:

receiving, by the user equipment, second configuration information sent by the base station; and acquiring, by the user equipment, a configuration parameter of the first pilot signal according to the second configuration information.

With reference to the fourth aspect and the first possible implementation manner, in a second possible implementation manner, before the receiving, by user equipment, by using a resource corresponding to a first pilot antenna port, a first pilot signal sent by a base station, the method further includes:

receiving, by the user equipment, third configuration information sent by the base station, where the third configuration information is used to indicate whether the base station is to send a second pilot signal to the user equipment.

According to the second possible implementation manner, in a third possible implementation manner, if the third configuration information indicates that the base station is to send the second pilot signal to the user equipment, after the receiving, by the user equipment, third configuration information sent by the base station, the method further includes:

receiving, by the user equipment, the second pilot signal by using a resource corresponding to the second pilot antenna port.

According to a fifth aspect of the present invention, a base station is provided, including:

a determining module, configured to determine a transmission period of a pilot antenna port group; and a sending module, configured to send, in a transmission period corresponding to each pilot antenna port group, a pilot signal to user equipment by using a resource corresponding to the pilot antenna port group, so that the user equipment measures channel quality according to the pilot signal.

According to the fifth aspect, in a first possible implementation manner, the sending module is further configured to:

send first configuration information to the user equipment, where the first configuration information is used to indicate whether the pilot signal is to be sent on a dedicated bandwidth of the user equipment or to be sent on a full bandwidth corresponding to the base station.

According to a sixth aspect of the present invention, a base station is provided, including:

a determining module, configured to determine at least two second pilot antenna ports as one first pilot antenna port; and a sending module, configured to send a first pilot signal to user equipment by using a resource corresponding to the first pilot antenna port, where the first pilot signal is used for channel quality measurement.

According to the sixth aspect, in a first possible implementation manner, the determining module is specifically configured to:

perform weighting on each of the second pilot antenna ports by using a weighting coefficient, to obtain the first pilot antenna port, where the weighting coefficient is predefined by the base station or fed back by the user equipment.

With reference to the sixth aspect and the first possible implementation manner, in a second possible implementation manner, the sending module is specifically configured to:

periodically send the first pilot signal to the user equipment by using the resource corresponding to the first pilot antenna port.

With reference to the sixth aspect, the first possible implementation manner, and the second possible implementation manner, in a third possible implementation manner, the sending module is further configured to:

send second configuration information to the user equipment, where the second configuration information is used to indicate a configuration parameter of the first pilot signal.

With reference to the sixth aspect, the first possible implementation manner, the second possible implementation manner, and the third possible implementation manner, in a fourth possible implementation manner, the sending module is further configured to:

send third configuration information to the user equipment, where the third configuration information is used to indicate whether the base station is to send a second pilot signal to the user equipment.

With reference to the fourth possible implementation manner, in a fifth possible implementation manner, the sending module is further configured to:

aperiodically send a second pilot signal to the user equipment by using a resource corresponding to the second pilot antenna port.

According to a seventh aspect of the present invention, user equipment is provided, including:

a receiving module, configured to receive, in a transmission period corresponding to each pilot antenna port group of a base station, a pilot signal by using a resource corresponding to the pilot antenna port group; and a measurement module, configured to measure channel quality according to the pilot signal, where the transmission period of the pilot antenna port group of the base station is determined by the base station.

With reference to the seventh aspect, in a first possible implementation manner, the receiving module is further configured to:

receive first configuration information; and determine, according to the first configuration information, whether to receive the pilot signal on a dedicated bandwidth of the user equipment or to receive the pilot signal on a full bandwidth corresponding to the base station.

According to an eighth aspect of the present invention, user equipment is provided, including:

a receiving module, configured to receive, by using a resource corresponding to a first pilot antenna port, a first pilot signal sent by a base station, where the first pilot antenna port is determined by the base station according to at least two second pilot antenna ports, and the first pilot signal is used for channel quality measurement.

According to the eighth aspect, in a first possible implementation manner, the receiving module is further configured to:

receive second configuration information sent by the base station; and acquire a configuration parameter of the first pilot signal according to the second configuration information.

With reference to the eighth aspect and the first possible implementation manner, in a second possible implementation manner, the receiving module is further configured to:

receive third configuration information sent by the base station, where the third configuration information is used to indicate whether the base station is to send a second pilot signal to the user equipment.

According to the second possible implementation manner, in a third possible implementation manner, the receiving module is further configured to:

receive the second pilot signal by using a resource corresponding to the second pilot antenna port.

According to a ninth aspect of the present invention, a base station is provided, including:

a processor, configured to determine a transmission period of a pilot antenna port group; and a transmitter, configured to send, in a transmission period corresponding to each pilot antenna port group, a pilot signal to user equipment by using a resource corresponding to the pilot antenna port group, so that the user equipment measures channel quality according to the pilot signal.

According to the ninth aspect, in a first possible implementation manner, the transmitter is further configured to:

send first configuration information to the user equipment, where the first configuration information is used to indicate whether the pilot signal is to be sent on a dedicated bandwidth of the user equipment or to be sent on a full bandwidth corresponding to the base station.

According to a tenth aspect of the present invention, a base station is provided, including:

a processor, configured to determine at least two second pilot antenna ports as one first pilot antenna port; and a transmitter, configured to send a first pilot signal to user equipment by using a resource corresponding to the first pilot antenna port, where the first pilot signal is used for channel quality measurement.

According to the tenth aspect, in a first possible implementation manner, the processor is specifically configured to:

perform weighting on each of the second pilot antenna ports by using a weighting coefficient, to obtain the first pilot antenna port, where the weighting coefficient is predefined by the base station or fed back by the user equipment.

With reference to the tenth aspect and the first possible implementation manner, in a second possible implementation manner, the transmitter is specifically configured to:

periodically send the first pilot signal to the user equipment by using the resource corresponding to the first pilot antenna port.

With reference to the tenth aspect, the first possible implementation manner, and the second possible implementation manner, in a third possible implementation manner, the transmitter is further configured to:

send second configuration information to the user equipment, where the second configuration information is used to indicate a configuration parameter of the first pilot signal.

With reference to the tenth aspect, the first possible implementation manner, the second possible implementation manner, and the third possible implementation manner, in a fourth possible implementation manner, the transmitter is further configured to:

send third configuration information to the user equipment, where the third configuration information is used to indicate whether the base station is to send a second pilot signal to the user equipment.

According to the fourth possible implementation manner, in a fifth possible implementation manner, the transmitter is further configured to:

aperiodically send a second pilot signal to the user equipment by using a resource corresponding to the second pilot antenna port.

According to an eleventh aspect of the present invention, user equipment is provided, including:

a receiver, configured to receive, in a transmission period corresponding to each pilot antenna port group of a base station, a pilot signal by using a resource corresponding to the pilot antenna port group; and a processor, configured to measure channel quality according to the pilot signal, where the transmission period of the pilot antenna port group of the base station is determined by the base station.

According to the eleventh aspect, in a first possible implementation manner, the receiver is further configured to:

receive first configuration information; and determine, according to the first configuration information, whether to receive the pilot signal on a dedicated bandwidth of the user equipment or to receive the pilot signal on a full bandwidth corresponding to the base station.

According to a twelfth aspect of the present invention, user equipment is provided, including:

a receiver, configured to receive, by using a resource corresponding to a first pilot antenna port, a first pilot signal sent by a base station, where the first pilot antenna port is determined by the base station according to at least two second pilot antenna ports, and the first pilot signal is used for channel quality measurement.

According to the twelfth aspect, in a first possible implementation manner, the receiver is further configured to:

receive second configuration information sent by the base station; and acquire a configuration parameter of the first pilot signal according to the second configuration information.

With reference to the twelfth aspect and the first possible implementation manner, in a second possible implementation manner, the receiver is further configured to:

receive third configuration information sent by the base station, where the third configuration information is used to indicate whether the base station is to send a second pilot signal to the user equipment.

According to the second possible implementation manner, in a third possible implementation manner, the receiver is further configured to:

receive the second pilot signal by using a resource corresponding to the second pilot antenna port.

According to the method for transmitting a pilot signal, the base station, and the user equipment in the embodiments of the present invention, the base station determines a transmission period of a pilot antenna port group, and sends, in a transmission period corresponding to each pilot antenna port group, a pilot signal to the user equipment by using a resource corresponding to the pilot antenna port group, so that the user equipment measures channel quality according to the pilot signal, thereby reducing pilot signal overheads.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
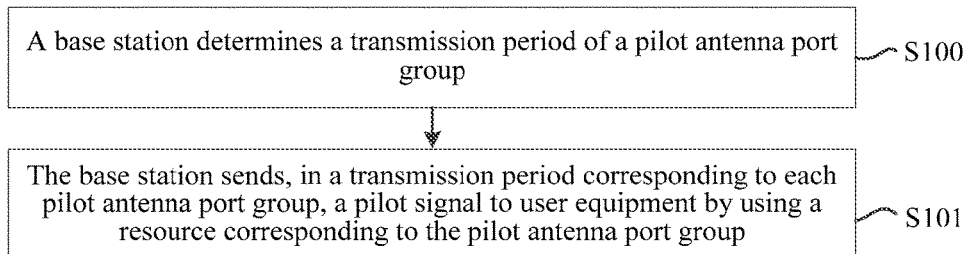
FIG. 1 is a flowchart of a method for transmitting a pilot signal according to Embodiment 1 of the present invention.

FIG. 1 is a flowchart of a method for transmitting a pilot signal according to Embodiment 1 of the present invention. As shown in FIG. 1, the method for transmitting a pilot signal provided in this embodiment may include the following steps:

Step S100: A base station determines a transmission period of a pilot antenna port group.

Step S101: The base station sends, in a transmission period corresponding to each pilot antenna port group, a pilot signal to user equipment by using a resource corresponding to the pilot antenna port group.

The steps in this embodiment may be performed by a base station, or may be performed by a device such as a relay node.

In the prior art, a base station sends a pilot signal by using an antenna port corresponding to the pilot signal, and as an antenna scale increases, a quantity of pilot antenna ports also increases; therefore, pilot signal overheads also increase. In this embodiment, the base station determines different transmission periods for a pilot antenna port group that includes pilot antenna ports, and sends a pilot signal to the user equipment by using the resource corresponding to the pilot antenna port group.

Specifically, the base station may determine multiple pilot antenna ports as one pilot antenna port group, and determine a transmission period for the pilot antenna port group. For example, the base station may determine different pilot antenna ports as one pilot antenna port group according to a correlation among the pilot antenna ports, so as to send pilot signals in a same transmission period.

After determining the period of the pilot antenna port group, the base station may send the pilot signal to the user equipment. Specifically, the base station may send, in a period corresponding to each pilot antenna port group, the pilot signal by using the resource corresponding to the pilot antenna port group, that is, at a time-frequency resource location corresponding to the pilot antenna port group. Herein, the pilot signal is used by the user equipment to measure channel quality, and in practice, may be a CSI-RS, a DMRS, or the like.

It should be noted that, transmission periods of different pilot antenna port groups may be the same, or may be different. For example, the base station may designate some of pilot antenna ports for channel quality measurement of a long period, so that a pilot antenna port group to which these pilot antenna ports belong may be corresponding to a long transmission period; and designate the other pilot antenna ports for channel quality measurement of a short period, so that a pilot antenna port group to which these pilot antenna ports belong may be corresponding to a short transmission period.

In addition, in practice, the base station may first determine a transmission period, and then select which pilot antenna ports are used to send the pilot signal each time. In fact, the foregoing operations are also to determine different transmission periods for different pilot antenna ports; therefore, also falls within the protection scope of the present invention.

In the foregoing embodiment, a base station determines a transmission period of a pilot antenna port group, and sends, in a transmission period corresponding to each pilot antenna port group, a pilot signal to user equipment by using a resource corresponding to the pilot antenna port group. Compared with the prior art in which all pilot antenna ports use a same transmission period, pilot signal overheads are greatly reduced.

Figure 2:
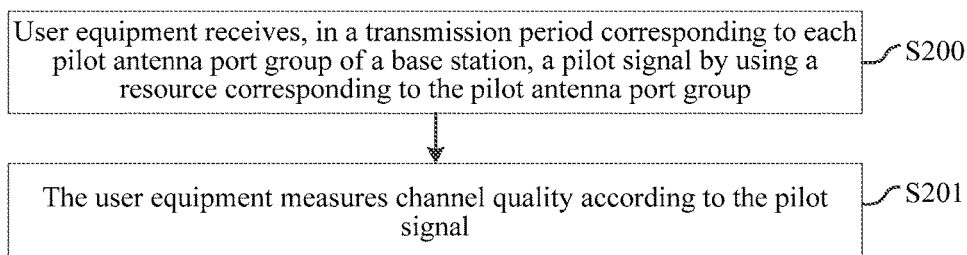
FIG. 2 is a flowchart of a method for transmitting a pilot signal according to Embodiment 2 of the present invention.

FIG. 2 is a flowchart of a method for transmitting a pilot signal according to Embodiment 2 of the present invention. As shown in FIG. 2, the method for transmitting a pilot signal provided in this embodiment may include the following steps:

Step S200: User equipment receives, in a transmission period corresponding to each pilot antenna port group of a base station, a pilot signal by using a resource corresponding to the pilot antenna port group.

Step S201: The user equipment measures channel quality according to the pilot signal.

The steps in this embodiment are performed by user equipment (UE for short) that may be UE applied to an LTE system in practice.

Specifically, after the base station sends the pilot signal to the UE, the UE needs to receive the pilot signal sent by the base station.

Further, because the base station sends the pilot signal in the transmission period of the pilot antenna port group, the UE needs to receive, in the transmission period, the pilot signal by using a resource corresponding to the pilot antenna port, that is, at a time-frequency resource location corresponding to the pilot antenna port, and then, the UE may perform channel quality measurement according to the pilot signal. Optionally, after completing the channel quality measurement, the UE may feed back a measurement result to the base station by using an uplink channel.

In the foregoing embodiment, user equipment receives, in a transmission period corresponding to each pilot antenna port group of a base station, a pilot signal by using a resource corresponding to the pilot antenna port group, and measures channel quality according to the pilot signal, thereby reducing pilot signal overheads.

Figure 3:
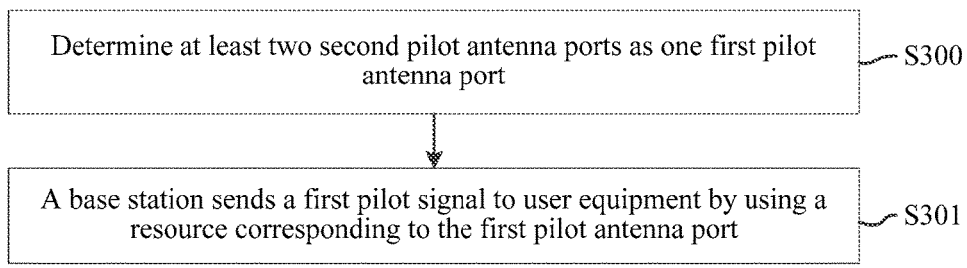
FIG. 3 is a flowchart of a method for transmitting a pilot signal according to Embodiment 3 of the present invention.

FIG. 3 is a flowchart of a method for transmitting a pilot signal according to Embodiment 3 of the present invention. As shown in FIG. 3, the method for transmitting a pilot signal provided in this embodiment may include the following steps:

Step S300: Determine at least two second pilot antenna ports as one first pilot antenna port.

Step S301: A base station sends a first pilot signal to user equipment by using a resource corresponding to the first pilot antenna port.

The steps in this embodiment may be performed by a base station, or may be performed by a device such as a relay node.

In the prior art, a base station sends a pilot signal by using all pilot antenna ports; therefore, as an antenna scale increases, pilot signal overheads also increase. In this embodiment, the base station first determines at least two second pilot antenna ports as one first pilot antenna port, thereby reducing pilot overheads.

In a feasible implementation manner, the base station may determine multiple second pilot antenna ports as one first pilot antenna port by means of an operation such as weighting. Herein, a quantity of weighted second pilot antenna ports is not specifically limited, and in practice, may be selected according to pilot overheads and a quantity of actual antenna ports.

In another feasible implementation manner, the base station may also select one second pilot antenna port from multiple second pilot antenna ports, as a first pilot antenna port, and in practice, the selection may be random, or a particular second pilot antenna port may be specified as a first pilot antenna port.

After determining the first pilot antenna port, the base station may send a first pilot signal to user equipment by using a resource corresponding to the first pilot antenna port, that is, at a time-frequency resource location corresponding to the first pilot antenna port.

Specifically, the first pilot signal is used by the user equipment to measure channel quality, for example, may be a CSI-RS, a DMRS, or the like.

In the foregoing embodiment, at least two second pilot antenna ports are determined as one first pilot antenna port, and then a first pilot signal is sent to user equipment by using a resource corresponding to the first pilot antenna port, thereby reducing a quantity of antenna ports for sending the first pilot signal, and further reducing pilot signal overheads.

Figure 4:
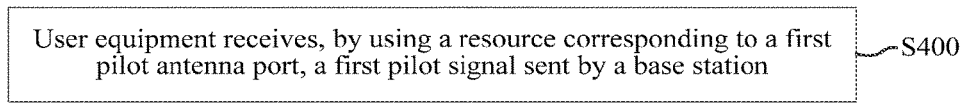
FIG. 4 is a flowchart of a method for transmitting a pilot signal according to Embodiment 4 of the present invention.

FIG. 4 is a flowchart of a method for transmitting a pilot signal according to Embodiment 4 of the present invention. As shown in FIG. 4, the method for transmitting a pilot signal provided in this embodiment may include the following step:

Step S400: User equipment receives, by using a resource corresponding to a first pilot antenna port, a first pilot signal sent by a base station.

The foregoing step is performed by user equipment that may be UE applied to an LTE system in practice.

Specifically, after the base station sends the first pilot signal to the UE, the UE needs to receive the first pilot signal.

Further, the UE may receive the first pilot signal at a time-frequency resource location corresponding to the first pilot antenna port, and perform channel quality measurement by using the first pilot signal.

In the foregoing embodiment, user equipment receives a first pilot signal by using a resource corresponding to a first pilot antenna port determined by using at least two second pilot antenna ports, and measures channel quality by using the first pilot signal, thereby reducing pilot signal overheads.

Figure 5:
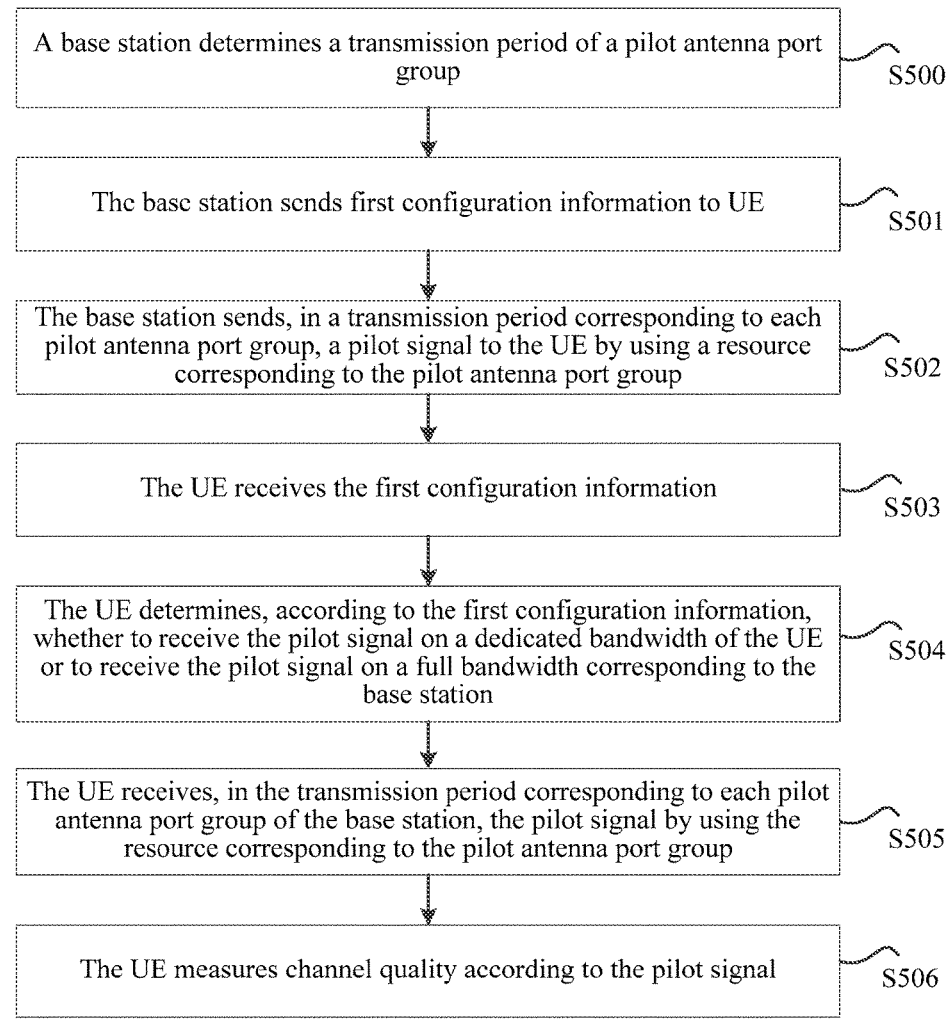
FIG. 5 is a flowchart of interaction between a base station and user equipment according to Embodiment 5 of the present invention.

FIG. 5 is a flowchart of interaction between a base station and user equipment according to Embodiment 5 of the present invention. As shown in FIG. 5, a process of the interaction between the base station and the user equipment in this embodiment may include the following steps:

Step S500: The base station determines a transmission period of a pilot antenna port group.

The foregoing step may be performed by a base station, or may be performed by a device such as a relay node.

Specifically, the base station may determine multiple pilot antenna ports as one pilot antenna port group, and then determine corresponding transmission periods for different pilot antenna port groups. The different pilot antenna port groups are corresponding to different transmission periods.

The LTE Release-10 protocol (Rel-10 for short) is used as an example. In a channel quality measurement method of a double codebook structure stipulated in the protocol, a total precoding matrix finally used is denoted by W, and W=W1*W2. W1 denotes long-term precoding information of a bandwidth, and is corresponding to a beam group that includes multiple beams in an existing codebook structure of LTE. W2 is short-term precoding information of a bandwidth or a sub-band, is used to select a beam from the foregoing beam group denoted by W1, and also includes phase rotations between different polarization directions. In practice, phases among pilot antenna ports in a same polarization direction in a double codebook structure are strongly correlated, that is, phase differences between any two neighboring pilot antenna ports in a same polarization direction are the same. Therefore, in this embodiment, the foregoing correlation is used to configure different transmission periods for different pilot antenna port groups.

Figure 6A:
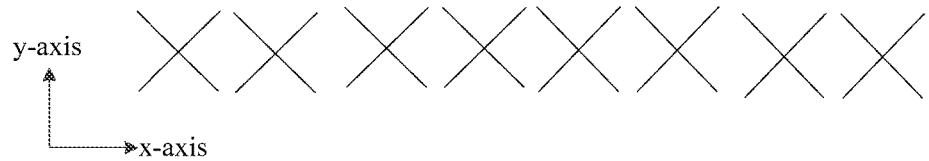
FIG. 6A is a schematic diagram of 16 pilot antenna ports in cross polarization.

Specifically, FIG. 6A is a schematic diagram of 16 pilot antenna ports in cross polarization. As shown in FIG. 6A, eight straight lines at a positive 45-degree angle along an x-axis direction denote eight pilot antenna ports, and their polarization directions are a first polarization direction, and eight straight lines at a negative 45-degree angle along the x-axis direction denote eight pilot antenna ports, and their polarization directions are a second polarization direction. In the foregoing double codebook structure, precoding information for the first polarization direction and precoding information for the second polarization direction are strongly correlated, that is, the precoding information for the second polarization direction differs only by one phase rotation compared with the precoding information for the first polarization direction.

Figure 6B:
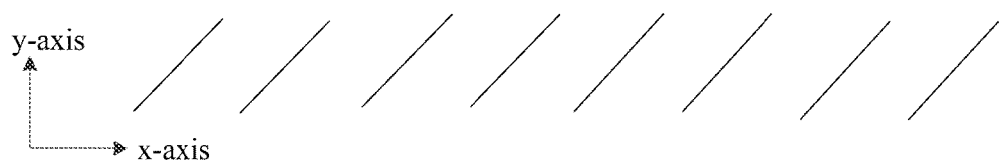
FIG. 6B is a schematic diagram of a pilot antenna port group according to Embodiment 5 of the present invention.
Figure 6C:
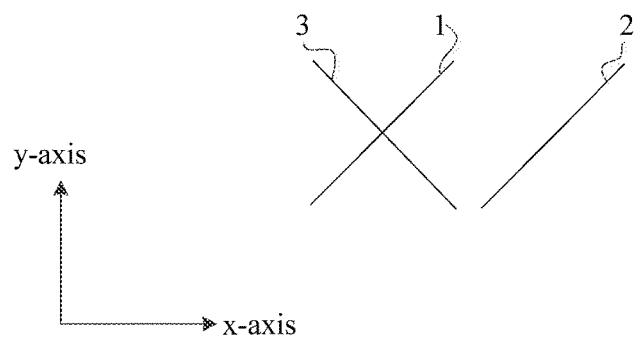
FIG. 6C is a schematic diagram of another pilot antenna port group according to Embodiment 5 of the present invention.

Further, FIG. 6B is a schematic diagram of a pilot antenna port group according to Embodiment 5 of the present invention. FIG. 6C is a schematic diagram of another pilot antenna port group according to Embodiment 5 of the present invention. As shown in FIG. 6B and FIG. 6C, when W1 in the foregoing double codebook structure is measured, eight pilot antenna ports that are all in a first polarization direction in FIG. 6B may be used as one pilot antenna port group, and the pilot antenna port group is used to send a pilot signal to measure the long-term precoding information W1; when W2 in the foregoing double codebook structure is measured, because W2 denotes a specific beam selection and a phase rotation between the first polarization direction and a second polarization direction, three pilot antenna ports in FIG. 6C may be used as one pilot antenna port group, and the pilot antenna port group is used to send a pilot signal to measure the short-term precoding information W2. Specifically, during measurement, pilot signals at a pilot antenna port 1 and a pilot antenna port 2 that are both in the first polarization direction may be measured to complete measurement of the beam selection, and pilot signals at the pilot antenna port 1 and a pilot antenna port 3 that are in different polarization directions may be measured to complete measurement of the phase rotation between the two polarization directions.

Optionally, because W1 denotes long-term precoding information of a bandwidth, a transmission period of a pilot antenna port group that includes the pilot antenna ports used to measure W1, that is, the eight pilot antenna ports in FIG. 6B, may be configured as a long period. W2 is corresponding to short-term precoding information, and therefore, a transmission period of a pilot antenna port group that includes the pilot antenna ports used to measure W2, that is, the three pilot antenna ports in FIG. 6C, may be configured as a short period.

For example, a sub-mode 1 of a feedback mode 1-1 of a physical uplink control channel (PUCCH for short) stipulated in the LTE Rel-10 is used as an example. Based on configuration of the pilot antenna ports in FIG. 6A, when W1 and W2 are measured in the prior art, there are always 16 pilot antenna ports used to send a pilot signal in each measurement. If measurement and feedback of a PMI completely match measurement of a pilot signal corresponding to the PMI, that is, measurement of the pilot signal is the same as a feedback timeslot of the PMI, in each feedback period, to measure W1 in a first feedback timeslot, 16 pilot antenna ports need to be used to send a pilot signal in the prior art, while only eight pilot antenna ports need to be used to send a pilot signal in the technical solution of this embodiment. To measure W2 in a second feedback timeslot, 16 pilot antenna ports need to be used to send a pilot signal in the prior art, while only three pilot antenna ports need to be used to send a pilot signal in the technical solution of this embodiment. To measure W2 in a third feedback timeslot, 16 pilot antenna ports need to be used to send a pilot signal in the prior art, while only three pilot antenna ports need to be used to send a pilot signal in the technical solution of this embodiment. To measure W1 in a fourth feedback timeslot, 16 pilot antenna ports need to be used to send a pilot signal in the prior art, while only eight pilot antenna ports need to be used to send a pilot signal in the technical solution of this embodiment. It can be seen that, the technical solution of this embodiment greatly reduces pilot signal overheads.

It should be noted that, pilot antenna ports in cross polarization are used only as an example herein. In practice, the technical solution of this embodiment is still applicable to pilot antenna ports that are in another polarization manner.

Step S501: The base station sends first configuration information to the UE.

The foregoing step may be performed by a base station, or may be performed by a device such as a relay node.

Specifically, the base station may send first configuration information to the UE, where the first configuration information is used to indicate whether the base station is to send a pilot signal on a dedicated bandwidth of the UE or to send a pilot signal on a full bandwidth corresponding to the base station.

In practice, a dedicated bandwidth occupied by the UE is generally less than or equal to a full bandwidth corresponding to the base station; therefore, sending a pilot signal on the dedicated bandwidth actually occupied by the UE may reduce pilot signal overheads.

Specifically, the first configuration information may be downlink control information (DCI for short). Optionally, the DCI may carry a first flag bit, and the first flag bit is used to indicate whether a pilot signal is to be sent on a dedicated bandwidth or to be sent on a full bandwidth. Specifically, 1 bit may be added to a field of the DCI as the first flag bit. When the first flag bit is 0, it indicates that the pilot signal is to be sent on the full bandwidth corresponding to the base station. When the first flag bit is 1, it indicates that the pilot signal is to be sent on the dedicated bandwidth of the UE, that is, in a bandwidth range scheduled by the DCI.

Further, the pilot signal may be a channel state information-reference signal CSI-RS. In this case, the first configuration information may be used to indicate a transmission bandwidth of the CSI-RS.

Still further, because a DM-RS is sent on the dedicated bandwidth of the UE, the DM-RS in the prior art may also be reused as the pilot signal. In this case, 1 bit may also be added to the DCI as the first flag bit, to indicate whether to measure channel quality based on the current pilot signal, that is, the DM-RS. For example, when the first flag bit is 0, it indicates that no DM-RS is used to measure channel quality; when the first flag bit is 1, it indicates that the DM-RS is used to measure channel quality. It should be noted that, when the DM-RS in the prior art is to be sent, a demodulation precoding matrix needs to be used for precoding; if the DM-RS is used for channel quality measurement, a demodulation precoding matrix corresponding to the DM-RS needs to be configured as an identity matrix.

Step S502: The base station sends, in a transmission period corresponding to each pilot antenna port group, a pilot signal to the UE by using a resource corresponding to the pilot antenna port group.

The foregoing step may be performed by a base station, or may be performed by a device such as a relay node.

The description of the step is the same as that of step S101, and details are not described herein again.

Step S503: The UE receives the first configuration information.

The foregoing step is performed by UE that may be UE applied to an LTE system in practice.

Specifically, after the base station sends the first configuration information to the UE, the UE needs to receive the first configuration information.

Step S504: The UE determines, according to the first configuration information, whether to receive the pilot signal on a dedicated bandwidth of the UE or to receive the pilot signal on a full bandwidth corresponding to the base station.

The foregoing step is performed by UE that may be UE applied to an LTE system in practice.

Specifically, it can be seen from the description of step S501 that the first configuration information is used to indicate to the UE whether the base station sends the pilot signal on the full bandwidth corresponding to the base station or on the dedicated bandwidth of the UE. Therefore, after receiving the first configuration information, the UE may determine, according to the first configuration information, a bandwidth on which the base station sends the pilot signal, and receive the pilot signal on the corresponding bandwidth. In other words, if the first configuration information indicates that the base station has sent the pilot signal on the full bandwidth corresponding to the base station, the UE may determine to receive the pilot signal on the full bandwidth corresponding to the base station; if the first configuration information indicates that the UE is to receive the pilot signal on the dedicated bandwidth of the UE, the UE may determine to receive the pilot signal on the dedicated bandwidth of the UE.

Step S505: The UE receives, in the transmission period corresponding to each pilot antenna port group of the base station, the pilot signal by using the resource corresponding to the pilot antenna port group.

The foregoing step is performed by user equipment that may be UE applied to an LTE system in practice.

The description of the step is the same as that of step S200, and details are not described herein again.

Step S506: The UE measures channel quality according to the pilot signal.

The foregoing step is performed by user equipment that may be UE applied to an LTE system in practice.

The description of the step is the same as that of step S201, and details are not described herein again.

In the foregoing embodiment, a base station determines a transmission period of a pilot antenna port group, and sends, in a transmission period corresponding to each pilot antenna port group, a pilot signal to UE by using a resource corresponding to the pilot antenna port group, so that the UE measures channel quality according to the pilot signal, thereby reducing pilot signal overheads.

Figure 7:
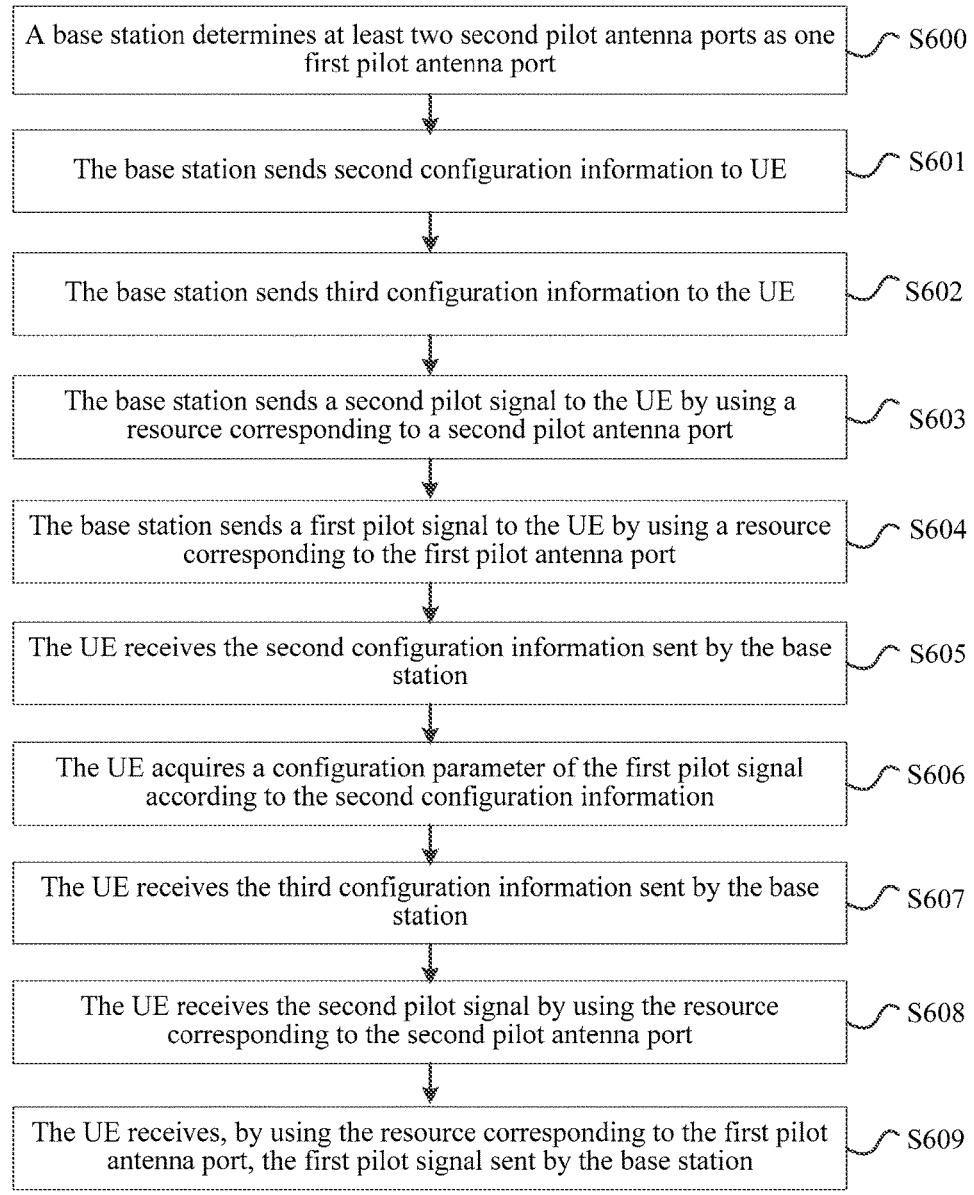
FIG. 7 is a flowchart of interaction between a base station and user equipment according to Embodiment 6 of the present invention.

FIG. 7 is a flowchart of interaction between a base station and UE according to Embodiment 6 of the present invention. As shown in FIG. 7, a process of the interaction between the base station and the UE in this embodiment may include the following steps:

Step S600: A base station determines at least two second pilot antenna ports as one first pilot antenna port.

The foregoing step may be performed by a base station, or may be performed by a device such as a relay node.

Specifically, to reduce pilot signal overheads, the base station may first determine two or more second pilot antenna ports as one first pilot antenna port.

Further, the base station may perform weighting on each of the second pilot antenna ports by using a weighting coefficient, to obtain the first pilot antenna port. Herein, the weighting coefficient may be predefined by the base station, or may be fed back by the UE. In practice, if the UE has fed back the weighting coefficient before step S600 is performed, the base station may perform weighting by using the weighting coefficient fed back by the UE or the weighting coefficient predefined by the base station; if the UE has not fed back the weighting coefficient before step S600 is performed, the base station performs weighting by using the weighting coefficient predefined by the base station.

Optionally, the foregoing step S600 may be periodically performed; in other words, in each period, the base station determines a first pilot antenna port by using a same weighting coefficient, and different periods may be corresponding to different weighting coefficients.

Step S601: The base station sends second configuration information to UE.

The foregoing step may be performed by a base station, or may be performed by a device such as a relay node.

Specifically, the second configuration information is used to indicate a configuration parameter of a first pilot signal.

Further, the configuration parameter may include: numbers and a quantity of first pilot antenna ports used to send the first pilot signal to the UE, a scrambling code sequence corresponding to the first pilot signal sent by the base station to the UE, a time-frequency resource location corresponding to the first pilot signal sent by the base station to the UE, and the like.

In practice, the second configuration information may be DCI. Optionally, the DCI may carry a second flag bit, and the second flag bit is used to indicate a configuration parameter of the first pilot signal.

Step S602: The base station sends third configuration information to the UE.

The foregoing step may be performed by a base station, or may be performed by a device such as a relay node.

Specifically, the third configuration information is used to indicate whether the base station is to send a second pilot signal to the UE. Herein, the second pilot signal is used to generate a weighting coefficient of next time.

Further, if the third configuration information indicates that the base station is to send the second pilot signal to the UE, the UE may measure the second pilot signal, to generate a weighting coefficient used when the second pilot antenna port is weighted in step S600, and feed back the weighting coefficient to the base station, for the base station to use when step S600 is performed next time.

Still further, the third configuration information may be DCI. Optionally, the DCI may carry a third flag bit, and the third flag bit is used to indicate whether the base station is to send the second pilot signal to the UE.

Step S603: The base station sends a second pilot signal to the UE by using a resource corresponding to a second pilot antenna port.

The foregoing step may be performed by a base station, or may be performed by a device such as a relay node.

Specifically, if the third configuration information indicates that the base station is to send the second pilot signal to the UE, the base station may send the second pilot signal to the UE by using a time-frequency resource corresponding to the second pilot antenna port.

Optionally, the base station may aperiodically send the second pilot signal to the UE.

It should be noted that, in practice, step S601 may also be performed after step S602 and S603, which is not limited herein. Moreover, step S603 is performed after the third configuration information indicates that the base station is to send the second pilot signal.

Step S604: The base station sends a first pilot signal to the UE by using a resource corresponding to the first pilot antenna port.

The foregoing step may be performed by a base station, or may be performed by a device such as a relay node.

Specifically, the base station may send the first pilot signal to the UE by using a time-frequency resource corresponding to the first pilot antenna port.

Optionally, the base station may periodically send the first pilot signal.

Step S605: The UE receives the second configuration information sent by the base station.

The foregoing step is performed by user equipment that may be UE applied to an LTE system in practice.

Specifically, after the base station sends the second configuration information to the UE, the UE needs to receive the second configuration information.

Step S606: The UE acquires a configuration parameter of the first pilot signal according to the second configuration information.

The foregoing step is performed by user equipment that may be UE applied to an LTE system in practice.

Specifically, because the second configuration information is used to indicate a configuration parameter of the first pilot signal, the UE may acquire, according to the second configuration information, numbers and a quantity of first pilot antenna ports used to send the first pilot signal, a scrambling code sequence corresponding to the first pilot signal, a time-frequency resource location corresponding to first pilot signal, and the like.

Step S607: The UE receives the third configuration information sent by the base station.

The foregoing step is performed by user equipment that may be UE applied to an LTE system in practice.

Specifically, after the base station sends the third configuration information to the UE, the UE may receive the third configuration information, to determine whether to receive the second pilot signal.

In practice, particularly, when the base station does not send the second pilot signal to the UE, the base station actively notifies the UE, and the UE may not perform an operation related to receiving the second pilot signal.

Step S608: The UE receives the second pilot signal by using the resource corresponding to the second pilot antenna port.

The foregoing step is performed by user equipment that may be UE applied to an LTE system in practice.

Specifically, when the third configuration information indicates that the base station has sent the second pilot signal, the UE may receive the second pilot signal at a time-frequency resource location corresponding to the second pilot antenna port.

Optionally, after receiving the second pilot signal, the UE may perform channel quality measurement by using the second pilot signal, generate a weighting coefficient that needs to be used by the base station when step S600 is performed next time, and then feed back the weighting coefficient to the base station by using an uplink channel.

It should be noted that, herein, only the sequence of step S605 and step S606, and the sequence of step S607 and step S608 are limited, but the sequence between the foregoing two sets of steps only needs to be consistent with an operation of the base station side, that is, steps S601 to S603, which is not specifically limited herein.

Step S609: The UE receives, by using the resource corresponding to the first pilot antenna port, the first pilot signal sent by the base station.

The foregoing step is performed by user equipment that may be UE applied to an LTE system in practice.

The description of the step is the same as that of step S400, and details are not described herein again.

The foregoing step S600 to step S609 are specifically described below by using an example.

Figure 8:
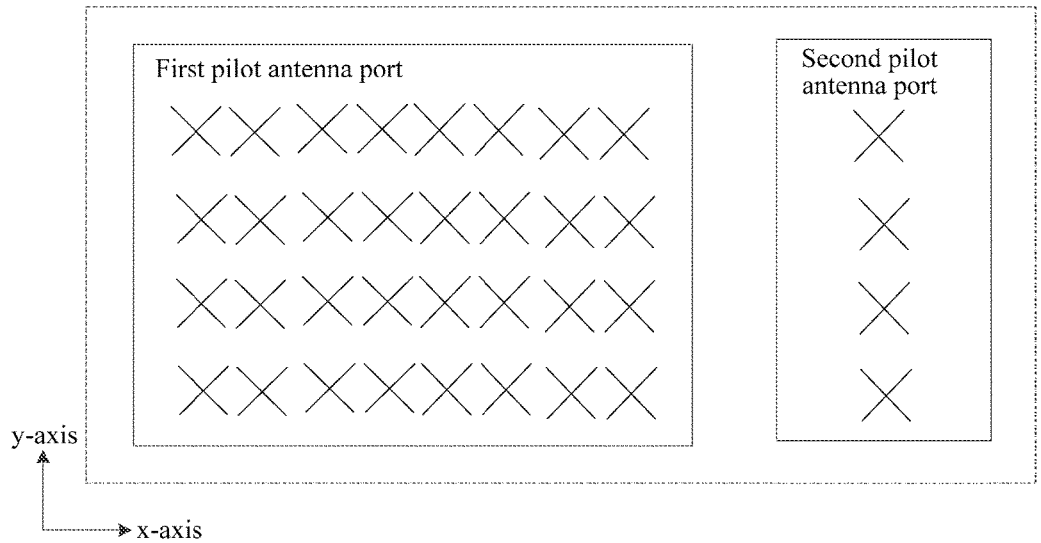
FIG. 8 is a schematic diagram of 64 pilot antenna ports in cross polarization.
Figure 9:
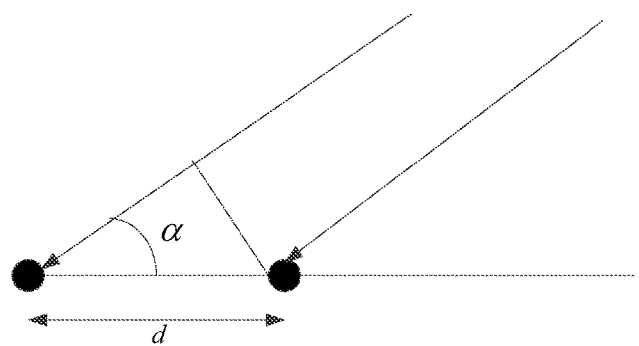
FIG. 9 is a schematic diagram of measurement of an angle of arrival of a beam according to Embodiment 6 of the present invention.

FIG. 8 is a schematic diagram of 64 pilot antenna ports in cross polarization. As shown in FIG. 8, 32 straight lines at a positive 45-degree angle along an x-axis direction denote 32 second pilot antenna ports, and 32 straight lines at a negative 45-degree angle along the x-axis direction also denote 32 second pilot antenna ports. In addition, in practice, UE may obtain precoding information by means of measurement based on an angle of arrival, and feed back the precoding information to a base station. FIG. 9 is a schematic diagram of measurement of an angle of arrival of a beam according to Embodiment 6 of the present invention. As shown in FIG. 9, black filled circles in the figure denote physical antennas of the UE, when a beam from the base station arrives at a physical antenna of the UE, an angle between the angle of arrival and the physical antenna is denoted by a, and a distance between two neighboring physical antennas of the UE is d; therefore, a distance between a first physical antenna and a $k^{th}$ physical antenna of the UE is d*(k−1).

Based on the description of the foregoing FIG. 8 and FIG. 9, the base station may first weight the second pilot antenna ports as a first pilot antenna port by using a weighting coefficient, for example, may first perform weighting on eight second pilot antenna ports in each row that are at a positive 45-degree angle in FIG. 8, to form a first pilot antenna port at a positive 45-degree angle, and then perform weighting on eight second pilot antenna ports in each row that are at a negative 45-degree angle in FIG. 8, to form a first pilot antenna port at a negative 45-degree angle. In this way, by means of weighting, 64 second pilot antenna ports may be used to generate eight first pilot antenna ports in FIG. 8.

Optionally, a formula $$W_{GOB} = \begin{bmatrix} 1 \\ e^{j\varphi_1} \\ e^{j\varphi_2} \\ M \\ e^{j\varphi_{k-1}} \end{bmatrix}, \quad (1)$$

$$\varphi_m = 2\pi \frac{(m-1)*d*\sin\alpha}{\lambda}$$

(1)

may be used as a weighting coefficient of the foregoing determined first pilot antenna port, where $W_{GOB}$ denotes the foregoing weighting coefficient, m denotes an $m^{th}$ second pilot antenna port used to form a first pilot antenna port, and a value is 1 to 8 herein, $\lambda$ denotes a wavelength of an optical wave, and k denotes a total quantity of first pilot antenna ports, and is 8 herein; therefore, a dimension of $W_{GOB}$ is 8 rows*1 column.

Based on the formula (1), for a total of 64 second pilot antenna ports, a fixed phase difference 8α is differed by between any two neighboring first pilot antenna ports in a co-polarization direction, that is, between two neighboring first pilot antenna ports in FIG. 8; therefore, for the 64 second pilot antenna ports in FIG. 8, a generated total weighting coefficient of eight first pilot antenna ports may be denoted by $W_{BF}$, with a specific expression being:

$$W_{BF} = \begin{bmatrix} W_{GOB} & 0 & 0 & 0 & 0 & 0 & 0 & 0 \\ 0 & e^{j8\alpha}W_{GOB} & 0 & 0 & 0 & 0 & 0 & 0 \\ 0 & 0 & e^{j16\alpha}W_{GOB} & 0 & 0 & 0 & 0 & 0 \\ 0 & 0 & 0 & e^{j24\alpha}W_{GOB} & 0 & 0 & 0 & 0 \\ 0 & 0 & 0 & 0 & W_{GOB} & 0 & 0 & 0 \\ 0 & 0 & 0 & 0 & 0 & e^{j8\alpha}W_{GOB} & 0 & 0 \\ 0 & 0 & 0 & 0 & 0 & 0 & e^{j16\alpha}W_{GOB} & 0 \\ 0 & 0 & 0 & 0 & 0 & 0 & 0 & e^{j24\alpha}W_{GOB} \end{bmatrix}$$

After determining eight first pilot antenna ports, the base station may send the first pilot signal by using the eight first pilot antenna ports. After receiving the first pilot signal, the UE may perform channel quality measurement on the first pilot signal, to obtain a precoding matrix $W_p$, and calculate a comprehensive precoding matrix by using $W_{BF}*W_p$, and then feed back the comprehensive precoding matrix to the base station.

In the foregoing embodiment, at least two second pilot antenna ports are determined as one first pilot antenna port, and then a first pilot signal is sent to user equipment by using a resource corresponding to the first pilot antenna port, thereby reducing a quantity of antenna ports for sending the first pilot signal, and further reducing pilot signal overheads.

Figure 10:
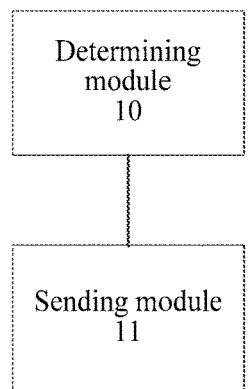
FIG. 10 is a schematic diagram of a structure of a base station according to Embodiment 7 of the present invention.

FIG. 10 is a schematic diagram of a structure of a base station according to Embodiment 7 of the present invention. As shown in FIG. 10, the base station provided in this embodiment includes: a determining module 10 and a sending module 11.

Specifically, the determining module 10 is configured to determine a transmission period of a pilot antenna port group; and the sending module 11 is configured to send, in a transmission period corresponding to each pilot antenna port group, a pilot signal to user equipment by using a resource corresponding to the pilot antenna port group, so that the user equipment measures channel quality according to the pilot signal.

Further, the sending module 11 is further configured to: send first configuration information to the user equipment, where the first configuration information is used to indicate whether the pilot signal is to be sent on a dedicated bandwidth of the user equipment or to be sent on a full bandwidth corresponding to the base station.

In the foregoing embodiment, the base station determines a transmission period of a pilot antenna port group, and sends, in a transmission period corresponding to each pilot antenna port group, a pilot signal to user equipment by using a resource corresponding to the pilot antenna port group, thereby reducing pilot signal overheads.

Figure 11:
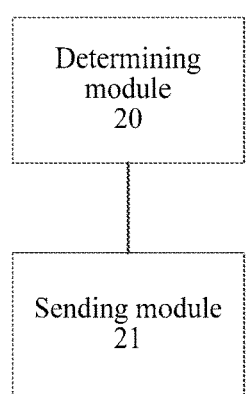
FIG. 11 is a schematic diagram of a structure of a base station according to Embodiment 8 of the present invention.

FIG. 11 is a schematic diagram of a structure of a base station according to Embodiment 8 of the present invention. As shown in FIG. 11, the base station provided in this embodiment includes: a determining module 20 and a sending module 21.

Specifically, the determining module 20 is configured to determine at least two second pilot antenna ports as one first pilot antenna port; and the sending module 21 is configured to send a first pilot signal to user equipment by using a resource corresponding to the first pilot antenna port, where the first pilot signal is used for channel quality measurement.

Further, the determining module 20 is specifically configured to: perform weighting on each of the second pilot antenna ports by using a weighting coefficient, to obtain the first pilot antenna port, where the weighting coefficient is predefined by the base station or fed back by the user equipment.

Still further, the sending module 21 is specifically configured to: periodically send the first pilot signal to the user equipment by using the resource corresponding to the first pilot antenna port.

Still further, the sending module 21 is further configured to: send second configuration information to the user equipment, where the second configuration information is used to indicate a configuration parameter of the first pilot signal.

Still further, the sending module 21 is further configured to: send third configuration information to the user equipment, where the third configuration information is used to indicate whether the base station is to send a second pilot signal to the user equipment.

Still further, the sending module 21 is further configured to: aperiodically send a second pilot signal to the user equipment by using the resource corresponding to the second pilot antenna port.

In the foregoing embodiment, at least two second pilot antenna ports are determined as one first pilot antenna port, and then a first pilot signal is sent to user equipment by using a resource corresponding to the first pilot antenna port, thereby reducing a quantity of antenna ports for sending the first pilot signal, and further reducing pilot signal overheads.

Figure 12:
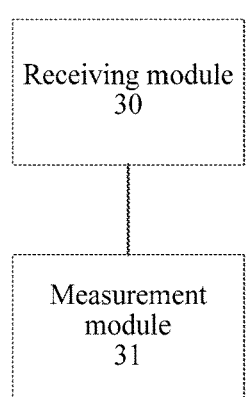
FIG. 12 is a schematic diagram of a structure of user equipment according to Embodiment 9 of the present invention.

FIG. 12 is a schematic diagram of a structure of user equipment according to Embodiment 9 of the present invention. As shown in FIG. 12, the user equipment provided in this embodiment includes: a receiving module 30 and a measurement module 31.

Specifically, the receiving module 30 is configured to receive, in a transmission period corresponding to each pilot antenna port group of a base station, a pilot signal by using a resource corresponding to the pilot antenna port group; and the measurement module 31 is configured to measure channel quality according to the pilot signal, where the transmission period of the pilot antenna port group of the base station is determined by the base station.

Further, the receiving module 30 is further configured to: receive first configuration information; and determine, according to the first configuration information, whether to receive the pilot signal on a dedicated bandwidth of the user equipment or to receive the pilot signal on a full bandwidth corresponding to the base station.

In the foregoing embodiment, the user equipment receives, in a transmission period corresponding to each pilot antenna port group of a base station, a pilot signal by using a resource corresponding to the pilot antenna port group, and measures channel quality according to the pilot signal, thereby reducing pilot signal overheads.

Figure 13:
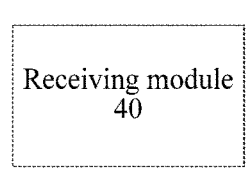
FIG. 13 is a schematic diagram of a structure of user equipment according to Embodiment 10 of the present invention.

FIG. 13 is a schematic diagram of a structure of user equipment according to Embodiment 10 of the present invention. As shown in FIG. 13, the user equipment provided in this embodiment includes: a receiving module 40.

Specifically, the receiving module 40 is configured to receive, by using a resource corresponding to a first pilot antenna port, a first pilot signal sent by a base station, where the first pilot antenna port is determined by the base station according to at least two second pilot antenna ports, and the first pilot signal is used for channel quality measurement.

Further, the receiving module 40 is further configured to: receive second configuration information sent by the base station; and acquire a configuration parameter of the first pilot signal according to the second configuration information.

Still further, the receiving module 40 is further configured to: receive third configuration information sent by the base station, where the third configuration information is used to indicate whether the base station is to send a second pilot signal to the user equipment.

Still further, the receiving module 40 is further configured to: receive the second pilot signal by using a resource corresponding to the second pilot antenna port.

In the foregoing embodiment, the user equipment receives a first pilot signal by using a resource corresponding to a first pilot antenna port determined by using at least two second pilot antenna ports, and measures channel quality by using the first pilot signal, thereby reducing pilot signal overheads.

Figure 14:
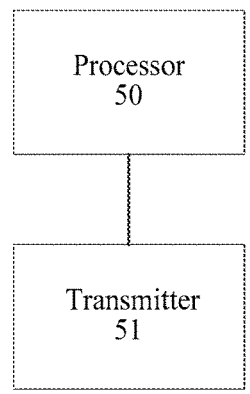
FIG. 14 is a schematic diagram of a structure of a base station according to Embodiment 11 of the present invention.

FIG. 14 is a schematic diagram of a structure of a base station according to Embodiment 11 of the present invention. As shown in FIG. 14, the base station provided in this embodiment includes: a processor 50 and a transmitter 51.

Specifically, the processor 50 is configured to determine a transmission period of a pilot antenna port group; and the transmitter 51 is configured to send, in a transmission period corresponding to each pilot antenna port group, a pilot signal to user equipment by using a resource corresponding to the pilot antenna port group, so that the user equipment measures channel quality according to the pilot signal.

Further, the transmitter 50 is further configured to: send first configuration information to the user equipment, where the first configuration information is used to indicate whether the pilot signal is to be sent on a dedicated bandwidth of the user equipment or to be sent on a full bandwidth corresponding to the base station.

In the foregoing embodiment, the base station determines a transmission period of a pilot antenna port group, and sends, in a transmission period corresponding to each pilot antenna port group, a pilot signal to user equipment by using a resource corresponding to the pilot antenna port group, thereby reducing pilot signal overheads.

Figure 15:
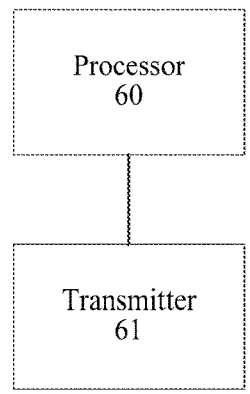
FIG. 15 is a schematic diagram of a structure of a base station according to Embodiment 12 of the present invention.

FIG. 15 is a schematic diagram of a structure of a base station according to Embodiment 12 of the present invention. As shown in FIG. 15, the base station provided in this embodiment includes: a processor 60 and a transmitter 61.

Specifically, the processor 60 is configured to determine at least two second pilot antenna ports as one first pilot antenna port; and the transmitter 61 is configured to send a first pilot signal to user equipment by using a resource corresponding to the first pilot antenna port, where the first pilot signal is used for channel quality measurement.

Further, the processor 60 is specifically configured to: perform weighting on each of the second pilot antenna ports by using a weighting coefficient, to obtain the first pilot antenna port, where the weighting coefficient is predefined by the base station or fed back by the user equipment.

Still further, the transmitter 61 is specifically configured to: periodically send the first pilot signal to the user equipment by using the resource corresponding to the first pilot antenna port.

Still further, the transmitter 61 is further configured to: send second configuration information to the user equipment, where the second configuration information is used to indicate a configuration parameter of the first pilot signal.

Still further, the transmitter 61 is further configured to: send third configuration information to the user equipment, where the third configuration information is used to indicate whether the base station is to send a second pilot signal to the user equipment.

Still further, the transmitter 61 is further configured to: aperiodically send a second pilot signal to the user equipment by using a resource corresponding to the second pilot antenna port.

In the foregoing embodiment, at least two second pilot antenna ports are determined as one first pilot antenna port, and then a first pilot signal is sent to user equipment by using a resource corresponding to the first pilot antenna port, thereby reducing a quantity of antenna ports for sending the first pilot signal, and further reducing pilot signal overheads.

Figure 16:
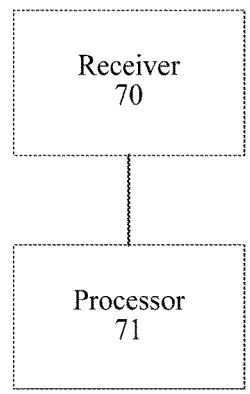
FIG. 16 is a schematic diagram of a structure of user equipment according to Embodiment 13 of the present invention.

FIG. 16 is a schematic diagram of a structure of user equipment according to Embodiment 13 of the present invention. As shown in FIG. 16, the user equipment provided in this embodiment includes: a receiver 70 and a processor 71.

Specifically, the receiver 70 is configured to receive, in a transmission period corresponding to each pilot antenna port group of a base station, a pilot signal by using a resource corresponding to the pilot antenna port group; and the processor 71 is configured to measure channel quality according to the pilot signal, where the transmission period of the pilot antenna port group of the base station is determined by the base station.

Further, the receiver 70 is further configured to: receive first configuration information; and determine, according to the first configuration information, whether to receive the pilot signal on a dedicated bandwidth of the user equipment or to receive the pilot signal on a full bandwidth corresponding to the base station.

In the foregoing embodiment, the user equipment receives, in a transmission period corresponding to each pilot antenna port group of a base station, a pilot signal by using a resource corresponding to the pilot antenna port group, and measures channel quality according to the pilot signal, thereby reducing pilot signal overheads.

Figure 17:
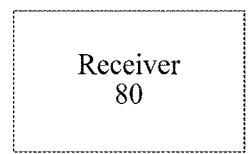
FIG. 17 is a schematic diagram of a structure of user equipment according to Embodiment 14 of the present invention.

FIG. 17 is a schematic diagram of a structure of user equipment according to Embodiment 14 of the present invention. As shown in FIG. 17, the user equipment provided in this embodiment includes: a receiver 80.

Specifically, the receiver 80 is configured to receive, by using a resource corresponding to a first pilot antenna port, a first pilot signal sent by a base station, where the first pilot antenna port is determined by the base station according to at least two second pilot antenna ports, and the first pilot signal is used for channel quality measurement.

Further, the receiver 80 is further configured to: receive second configuration information sent by the base station; and acquire a configuration parameter of the first pilot signal according to the second configuration information.

Still further, the receiver 80 is further configured to: receive third configuration information sent by the base station, where the third configuration information is used to indicate whether the base station is to send a second pilot signal to the user equipment.

Still further, the receiver 80 is further configured to: receive the second pilot signal by using a resource corresponding to the second pilot antenna port.

In the foregoing embodiment, the user equipment receives a first pilot signal by using a resource corresponding to a first pilot antenna port determined by using at least two second pilot antenna ports, and measures channel quality by using the first pilot signal, thereby reducing pilot signal overheads.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for transmitting a pilot signal, comprising:
determining at least two second pilot antenna ports as a single first pilot antenna port; and
sending, by a base station, a first pilot signal to user equipment by using a time-frequency resource corresponding to the first pilot antenna port, so that the user equipment measures channel quality according to the first pilot signal;
wherein the determining the at least two second pilot antenna ports as a single first pilot antenna port comprises performing, by the base station, a phase weighting on each of the at least two second pilot antenna ports, of the single first pilot antenna port, by using a phase weighting coefficient,
wherein the phase weighting coefficient for each of the at least two second pilot antenna ports is defined by either the base station or the user equipment, and
wherein the phase weighting coefficient ($W_{GOB}$) on each of the at least two pilot antenna ports is defined as:

$$W_{GOB} = \begin{bmatrix} 1 \\ e^{j\varphi_1} \\ e^{j\varphi_2} \\ \vdots \\ e^{j\varphi_{i-1}} \end{bmatrix}, \varphi_m = 2\pi \frac{(m-1)*d*\sin\alpha}{\lambda}$$

where, m denotes an $m^{th}$ one of the at least two second pilot antenna ports, $\lambda$ denotes a wavelength, and k denotes a total quantity of the at least two second pilot antenna ports of the first pilot antenna port,
where $\alpha$ is an angle between an angle of arrival and a physical antenna when a beam arrives at the physical antenna of the user equipment, and
where d is a distance between two neighboring physical antennas of the user equipment.

2. The method according to claim 1 further comprising, before the sending a first pilot signal to user equipment, sending, by the base station, a first configuration information to the user equipment, wherein the first configuration information is used to indicate whether the first pilot signal is to be sent on a dedicated bandwidth of the user equipment or to be sent on a full bandwidth corresponding to the base station.

3. The method according to claim 2, wherein the first configuration information is downlink control information (DCI), wherein the DCI carries a first flag bit, and wherein the first flag bit is used to indicate whether the first pilot signal is to be sent on the dedicated bandwidth or to be sent on the full bandwidth.

4. The method according to claim 3, wherein the first pilot signal is a channel state information-reference signal (CSI- RS), or a downlink demodulation reference signal (DM-RS) using an identity matrix as a demodulation precoding matrix.

5. A method carried out on a user equipment for processing a first pilot signal transmitted by a base station, the method comprising:

receiving, by the user equipment, the first pilot signal by using a time-frequency resource corresponding to a single first pilot antenna port, wherein the single first pilot antenna port is determined by the base station from at least two second pilot antenna ports; and performing, by the user equipment, a channel quality measurement according to the first pilot signal, wherein the determining the at least two second pilot antenna ports as the single first pilot antenna port comprises performing, by the base station, a phase weighting on each of the at least two second pilot antenna ports, of the single first pilot antenna port, by using a phase weighting coefficient, wherein the phase weighting coefficient for each of the at least two second pilot antenna ports is defined by either the base station or the user equipment, and wherein the phase weighting coefficient ($W_{GOB}$) on each of the at least two pilot antenna ports is defined as:

$$W_{GOB} = \begin{bmatrix} 1 \\ e^{j\varphi_1} \\ e^{j\varphi_2} \\ \vdots \\ e^{j\varphi_{i-1}} \end{bmatrix}, \varphi_m = 2\pi \frac{(m-1)*d*\sin\alpha}{\lambda}$$

where, m denotes an $m^{th}$ one of the at least two second pilot antenna ports, $\lambda$ denotes a wavelength, and k denotes a total quantity of the at least two second pilot antenna ports of the first pilot antenna port, where $\alpha$ is an angle between an angle of arrival and a physical antenna when a beam arrives at the physical antenna of the user equipment, and where d is a distance between two neighboring physical antennas of the user equipment.

6. The method according to claim 5 further comprising, before the receiving the first pilot signal by the user equipment:

receiving, by the user equipment, a first configuration information; and determining, by the user equipment, according to the first configuration information, whether to receive the first pilot signal on a dedicated bandwidth of the user equipment or to receive the first pilot signal on a full bandwidth corresponding to the base station.

7. A base station, comprising:

a processor, configured to determine at least two second pilot antenna ports as a single first pilot antenna port; and a transmitter, configured to send a first pilot signal to user equipment by using a time-frequency resource corresponding to the first pilot antenna port, so that the user equipment measures channel quality according to the first pilot signal;

wherein the determining the at least two second pilot antenna ports as a single first pilot antenna port comprises performing, by the base station, a phase weighting on each of the at least two second pilot antenna ports, of the single first pilot antenna port, by using a phase weighting coefficient, wherein the phase weighting coefficient for each of the at least two second pilot antenna ports is defined by either the base station or the user equipment, and wherein the phase weighting coefficient ($W_{GOB}$) on each of the at least two pilot antenna ports is defined as:

$$W_{GOB} = \begin{bmatrix} 1 \\ e^{j\varphi_1} \\ e^{j\varphi_2} \\ \vdots \\ e^{j\varphi_{i-1}} \end{bmatrix}, \varphi_m = 2\pi \frac{(m-1)*d*\sin\alpha}{\lambda}$$

where, m denotes an $m^{th}$ one of the at least two second pilot antenna ports, $\lambda$ denotes a wavelength, and k denotes a total quantity of the at least two second pilot antenna ports of the first pilot antenna port, where $\alpha$ is an angle between an angle of arrival and a physical antenna when a beam arrives at the physical antenna of the user equipment, and where d is a distance between two neighboring physical antennas of the user equipment.

8. The base station according to claim 7, further configured to:

send a first configuration information to the user equipment, wherein the first configuration information is used to indicate whether the first pilot signal is to be sent on a dedicated bandwidth of the user equipment or to be sent on a full bandwidth corresponding to the base station.

9. The base station according to claim 7, wherein the first configuration information is downlink control information DCI, the DCI carries a first flag bit, and the first flag bit is used to indicate whether the first pilot signal is to be sent on the dedicated bandwidth or to be sent on the full bandwidth.

10. A user equipment, comprising:

a receiver, configured to receive a first pilot signal by using a time-frequency resource corresponding to a single first pilot antenna port, wherein the single first pilot antenna port is determined by the base station from at least two second pilot antenna ports; and a processor, configured to perform a channel quality measurement according to the first pilot signal, wherein the determining the at least two second pilot antenna ports as the single first pilot antenna port comprises performing, by the base station, a phase weighting on each of the at least two second pilot antenna ports, of the single first pilot antenna port, by using a phase weighting coefficient, wherein the phase weighting coefficient for each of the at least two second pilot antenna ports is defined by either the base station or the user equipment, and wherein the phase weighting coefficient ($W_{GOB}$) on each of the at least two pilot antenna ports is defined as:

$$W_{GOB} = \begin{bmatrix} 1 \\ e^{j\varphi_1} \\ e^{j\varphi_2} \\ \vdots \\ e^{j\varphi_{i-1}} \end{bmatrix}, \varphi_m = 2\pi \frac{(m-1)*d*\sin\alpha}{\lambda}$$

where, m denotes an $m^{th}$ one of the at least two second pilot antenna ports, $\lambda$ denotes a wavelength, and k denotes a total quantity of the at least two second pilot antenna ports of the first pilot antenna port, where $\alpha$ is an angle between an angle of arrival and a physical antenna when a beam arrives at the physical antenna of the user equipment, and where d is a distance between two neighboring physical antennas of the user equipment.

11. The user equipment according to claim 10, wherein the receiver is further configured to:
  receive a first configuration information; and
  determine, according to the first configuration information, whether to receive the first pilot signal on a dedicated bandwidth of the user equipment or to receive the first pilot signal on a full bandwidth corresponding to the base station.

* * * * *

UNITED STATES PATENT AND TRADEMARK OFFICE
CERTIFICATE OF CORRECTION

PATENT NO. : 10,404,430 B2  Page 1 of 1
APPLICATION NO. : 15/184546
DATED : September 3, 2019
INVENTOR(S) : Liu et al.

It is certified that error appears in the above-identified patent and that said Letters Patent is hereby corrected as shown below:

On the Title Page

Page 2, Column 1, References Cited, U.S. Patent Documents, 20120113852A1, "Ku et al." should read -- Xu et al. --.

Signed and Sealed this
Third Day of March, 2020

Andrei Iancu
*Director of the United States Patent and Trademark Office*